United States Patent [19]

Molnar

[11] 3,886,655

[45] June 3, 1975

[54] CUTTING DEVICE FOR FLEXIBLE SPIRAL TUBES AND CABLES

[76] Inventor: Sandor Molnar, 5630 Riverdale Ave., Bronx, N.Y. 10471

[22] Filed: Nov. 19, 1973

[21] Appl. No.: 416,857

Related U.S. Application Data

[63] Continuation-in-part of Ser. Nos. 300,497, Oct. 25, 1972, and Ser. No. 206,970, April 17, 1972.

[52] U.S. Cl. .................... 30/90.3; 30/91.1; 83/924
[51] Int. Cl. ............................................. B21f 13/00
[58] Field of Search ......................... 30/90.3–90.9, 30/90.1, 90.2, 91.1, 91.2; 81/9.51; 83/441.1, 440.2, 444, 477, 477.2, 574, 924

[56] References Cited
UNITED STATES PATENTS

| | | | |
|---|---|---|---|
| 283,556 | 8/1883 | Barney | 83/924 X |
| 2,374,753 | 5/1945 | Kramer | 30/90.9 |
| 2,396,442 | 3/1946 | Shaver et al. | 83/924 X |
| 2,502,656 | 4/1950 | Koett | 30/90.3 X |
| 2,642,651 | 6/1953 | Palley | 30/90.3 |
| 2,687,560 | 8/1954 | Palley | 30/90.3 |
| 2,746,493 | 5/1956 | Babcock | 83/574 |
| 3,093,023 | 6/1963 | Vail | 30/90.4 |
| 3,537,349 | 11/1970 | Scott | 83/924 X |
| 3,633,275 | 1/1972 | Hutchinson | 30/90.3 |

*Primary Examiner*—Al Lawrence Smith
*Assistant Examiner*—J. T. Zatarga
*Attorney, Agent, or Firm*—Bierman & Bierman

[57] ABSTRACT

A device for cutting flexible spiral tubes or cables is provided having a housing in which an axle is rotatably mounted. A disc blade is affixed to the axle and positioned within the housing such that the outer edge protrudes into a groove provided on the top of the housing. The tube or cable to be cut is placed within the groove is contact with the edge of the blade. Means are provided for removably connecting one end of said axle to a drilling mechanism to rotate the axle and blade such that the tube or cable within the groove is cut. One embodiment provides means for changing the size of the groove to accommodate different diameter cables.

9 Claims, 10 Drawing Figures

CUTTING DEVICE FOR FLEXIBLE SPIRAL TUBES AND CABLES

This application is a continuation-in-part of application Ser. No. 300,497 filed Oct. 25, 1972 and application Ser. No. 206,970 filed Apr. 17, 1972, both entitled CUTTING DEVICE FOR FLEXIBLE SPIRAL TUBE/TUBES MADE OF SYNTHETICS, PLASTICS, AS WELL AS METAL/ AND CUTTING APPARATUS FOR ELECTRIC WIRES ENCASED IN FLEXIBLE SPIRAL CONDUIT TUBES /ARMORED CABLE BX., both now abandoned.

This invention relates to cutting devices, and more particularly to a novel device for cutting flexible spiral tubes and cables. It is adapted to be used in conjunction with any standard drilling mechanism to supply the necessary power to enable the cutting device to function.

The electrical industry for many years has used various types of armored cable consisting of a flexible metal or plastic sheath or tube which encases a multitude of wires. In order to perform any work on these type armored cables, it is often necessary to slice or cut the outer flexible tube, but at the same time leave the wires within the tube completely intact. The present invention is a device for accomplishing this purpose in a safe, fast and easy manner.

In addition, tubes themselves, either of the flexible or non-flexible variety, are used for a multitude of different purposes in many different industries. It is often necessary to cut or slice a length of such tubing. The present invention is a device for performing this cutting operation quickly and safely in a portable and inexpensive manner.

In accordance with the present invention, a housing is provided to encase the mechanism so that it is impossible for the operator to injure himself during the cutting process. In addition, means for positioning the cable or tube to be cut are provided on the housing to impart stability to the cable or tube and insure completely safe operation by totally covering all of the moving parts of the mechanism.

Means are provided for transferring power in the form of torque from an external drilling mechanism to the cutting blade which is rotatably mounted within the housing. The edge of the cutting blade extends into the area on the housing in which the cable or tube will be positioned. Once the cable or tube is in position, the mechanism is completely covered and no moving parts are exposed, so that the operator can perform the cutting operation in complete safety. The blade extends into the cutting area for a distance which is adequate only to slice the protective armor on the cable or tube without injuring the inner portions of the wire.

One of the embodiments disclosed herein is provided with a means for changing the shape of the cable positioning means to accommodate different sizes of cable or tube. The use of the appropriately-sized positioning means will eliminate wobble of the cable as the cable is drawn through the device. This will insure an even straight slice along the length of the cable.

In its preferred form, the invention comprises an axle which is rotatably mounted within a housing. The housing may be made of metal, heavy duty plastic, nylon or any other suitable material. A hacksaw disc blade, strong enough to cut through the metal armor on a cable or tubing, is provided fixably mounted to the axle.

The axle is mounted within the housing by means of ball bearings so that it is freely rotatable. One end of the axle is threaded to accept a drilling mechanism to supply torque for rotating the axle and the blade. The axle may be internally or externally threaded, depending upon the drilling mechanism which is being utilized.

Another embodiment disclosed herein is provided with a movable collar surrounding the housing. The movement of the collar from one position to another changes the size and/or shape of the positioning groove for the cable or tubing. Thus, the device can be used with a variety of cables or tubes of different diameter and still produce a straight even cut or slice.

The housing completely covers the entire mechanism except for that small portion of the blade which extends into the groove. Once the cable is placed within the groove, the entire mechanism is shielded so that it is impossible for the operator to injure himself during the cutting operation.

If desired, the cutting mechanism can be permanently fixed to a power source such as an electric motor which can even be incorporated into an extension of the housing. In this type of configuration, a standard gear box could be provided between the motor and the axle to either increase or decrease the ratio of the rotation speed of the motor to the rotation speed of the axle and, therefore, the cutting blade. An electric switch and the appropriate wiring can also be provided, if desired. The addition of an electric motor and appropriate gears are completely conventional and one skilled in the art could easily incorporate these features into the basic device.

In addition, means for adjusting the angle of the cutting blade could easily be provided, if desired. Again, such a refinement could easily be incorporated by one skilled in the art.

Now turning to the drawings which depict a preferred embodiment of the present invention and wherein like letters refer to like parts:

Figure 1:
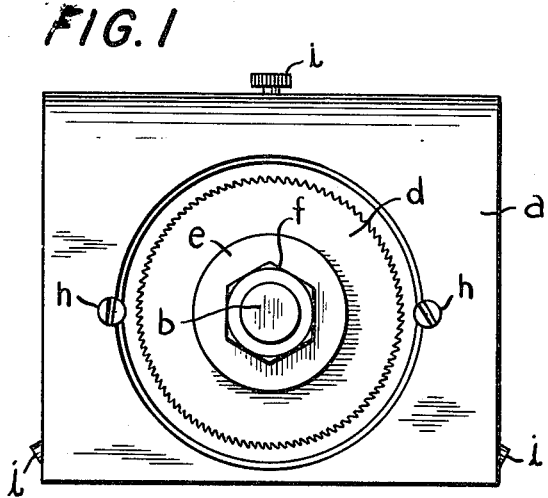
FIG. 1 is a back plan view showing the axle and blade within the housing.

As shown in FIG. 1, housing $a$ has an axle $b$ rotatably mounted within it. As best seen from FIG. 5, the mounting is accomplished by a series of ball bearings $c$ which allow axle $b$ to rotate freely with respect to housing $a$. A hacksaw disc blade $d$ is fixably mounted to axle $b$ by means of a nut $f$, a metal disc functioning in a clamping capacity.

Figure 5:
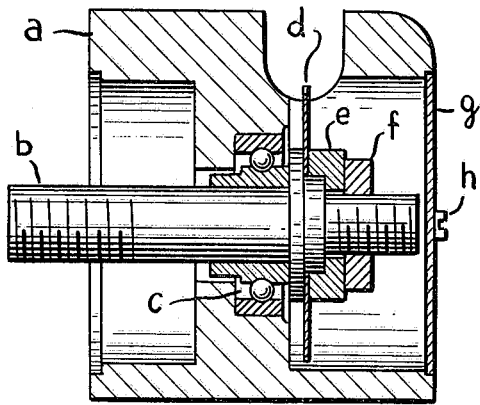
FIG. 5 is a side cutaway view showing the internal cutting mechanism.
Figure 6:
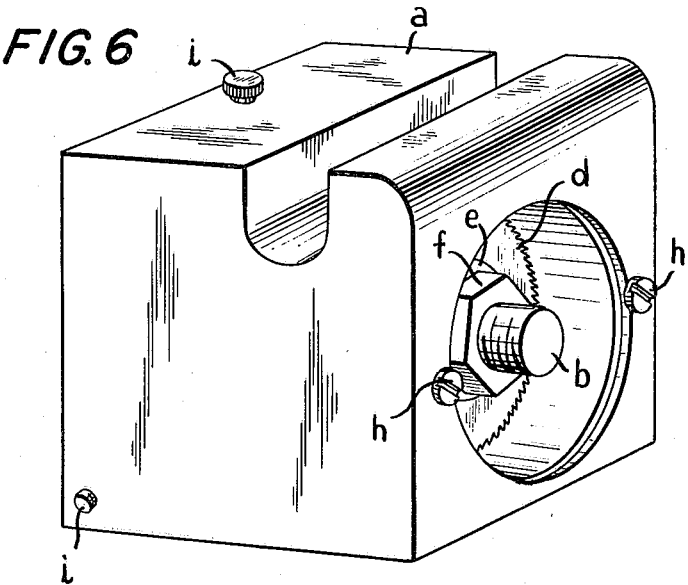
FIG. 6 is a perspective view of the cutting device.

The rear end of axle b is threaded to accept the chuck of an external drilling mechanism. The threading may be internal or external, depending upon the type of drilling mechanism which is used. FIG. 5 herein shows the threading as being external.

A groove is provided on the top section of the housing to enable the cable or tubing to be inserted therein and come into communication with the edge of the hacksaw disc blade d. The blade d extends into the groove only to the extent of the thickness of the armor on the cable or tubing so that the operator cannot possibly cut the internal wiring as he splices the cable.

A metal plate g is provided to cover the front of the housing so that the operator cannot accidentally place his finger within the housing in contact with the blade. This plate g is connected to the housing by means of two screws h positioned to clamp the plate g over the opening in housing a where the blade d is present. Therefore, once the cable is in place within the groove, blade d is completely surrounded and the operator is shielded and protected from the moving parts of the mechanism so that the operation is completely safe.

Figure 2:
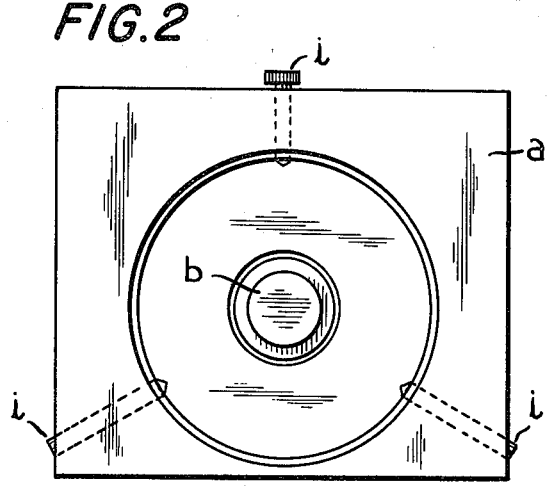
FIG. 2 is a front plan view showing the portion where the drilling mechanism is connected to the cutting device.
Figure 3:
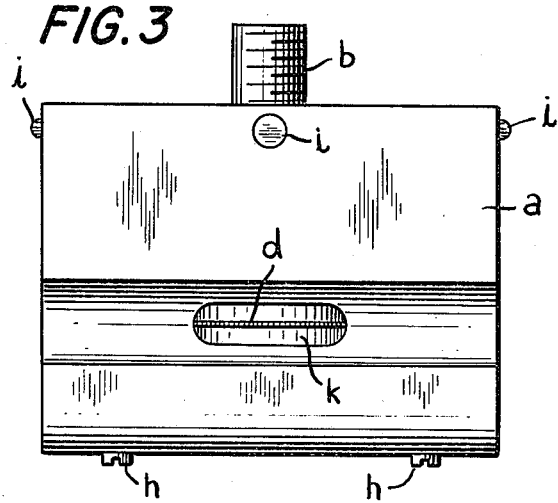
FIG. 3 is a top plan view of the device showing the blade within the groove.
Figure 4:
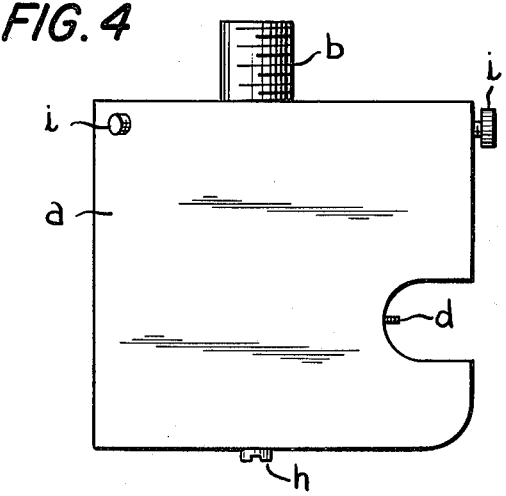
FIG. 4 is a side view of the housing showing the blade protruding into the groove.

As can be clearly seen from FIG. 2, three clamping screws i are provided in the rear portion of the housing. These screws will be used to position and hold the housing on the drilling mechanism once the drill chuck has been connected to the threaded portion of axle b. The top clamp screw i can be turned to facilitate positive clamping of the drilling mechanism within the housing. When detachment is desired, the top clamping screw i is merely loosened, the drill chuck opened, and the drilling mechanism withdrawn.

Figure 7:
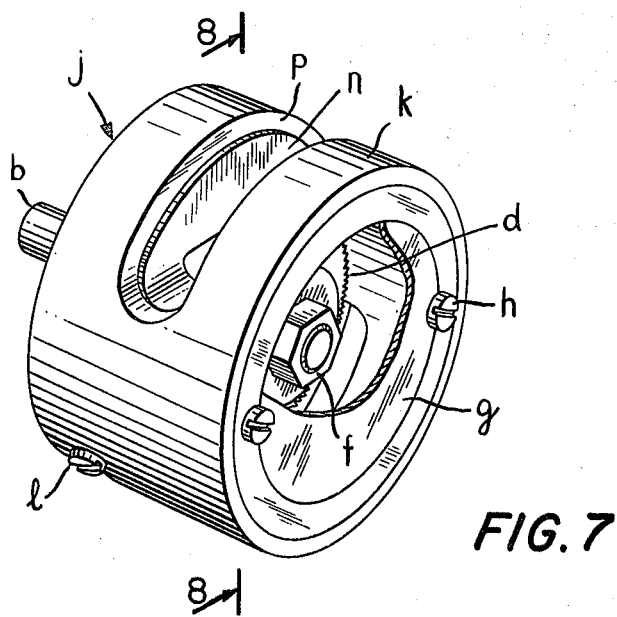
FIG. 7 is a perspective view of another preferred embodiment having a circular housing and a movable collar to adjust the groove size.
Figure 8:
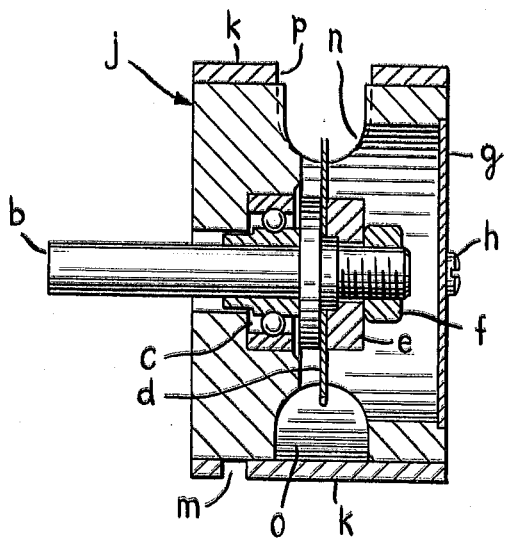
FIG. 8 is a top cross-sectional view of the embodiment of FIG. 7.
Figure 9:
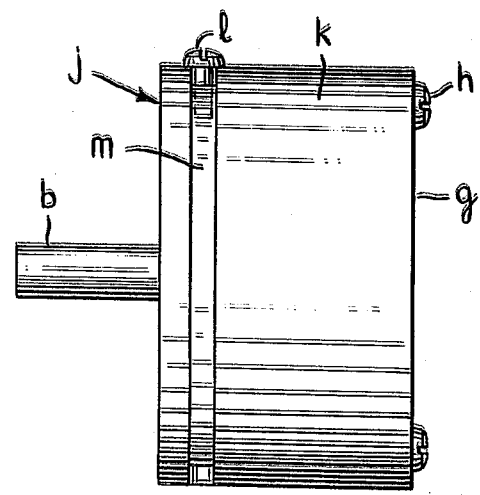
FIG. 9 is a bottom view of the embodiment shown in FIG. 7 showing the collar mounting.
Figure 10:
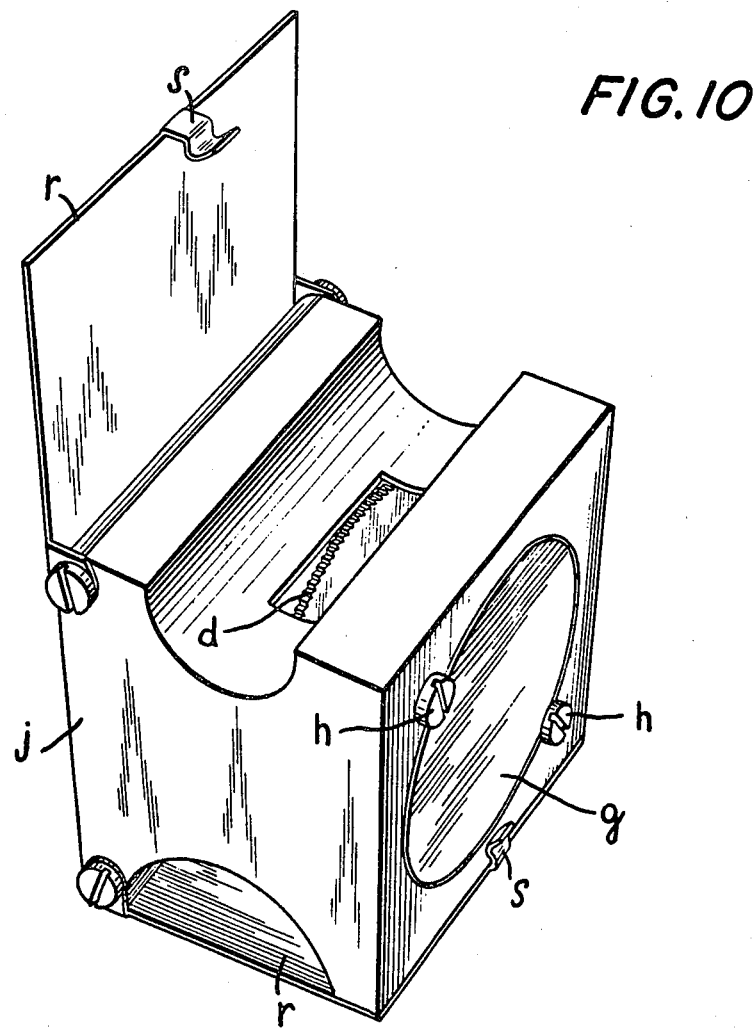
FIG. 10 is a perspective view of another embodiment of the instant invention.

FIGS. 7, 8 and 9 show another preferred embodiment of the present invention. This embodiment has a circular housing j with a collar k adapted to fit around the periphery of the housing j. Collar k is rotatably mounted to housing j by means of a moving connection comprised of a protrusion, shown here as screw l, and slot m. Collar k can therefore be rotated with respect to housing j within the limits of the movable connection.

Housing j is provided with two separate grooves, n and o, of different size and/or shape. As shown here, grooves n and o are at opposite ends of a diameter of circular housing j. Collar k has only one groove p which will align with the rims of either of the grooves n or o when positioned in the correct relationship with respect to them.

Thus, by rotating collar k with respect to housing j, the particular groove, i.e., n or o, can be selected for use. This selection will depend, of course, upon the size and shape of the cable or tube to be sliced or cut.

In order to retain the BX cable in the housing during the cutting operation, a cover r may be provided in which a spring clip s is mounted. The spring clip s is adapted to retain the cover in the closed position. Of course, the cover also prevents accidental injury to workmen handling the device since blade d can be kept covered at all times the device is not in use. Although not shown, an indentation may be made in the housing adjacent the spring clip s which will provide a lip to aid in retaining the cover in its closed position.

It is obvious that one skilled in the art, using this basic system could easily devise a device which had three, four or more different sized and/or shaped grooves for use with a variety of sized or shaped tubes or cables. The embodiment described herein as having two different-sized grooves is for illustrative purposes only.

In operation, after the drill chuck has been connected to the threaded portion of axle b, and clamp screws i tightened to insure positive clamping of the drilling mechanism within the housing, the collar is rotated to select the appropriate sized groove for the particular cable or tube to be cut, if the circular embodiment is being used, and the cable or tubing is placed lengthwise within the groove. The drilling mechanism is activated, supplying towque to the axle and thus rotating the cutting blade. The cable or tubing is drawn through the groove by the operator and the armor or tubing is cut without injuring the inner wires.

Because the cutting mechanism is completely shielded from the operator, the operator need not be overly concerned with keeping his hands away from the cutting device. The cutting is thus quickly, easily and safely performed.

After the completion of the cutting operation, top clamp screw i is loosened, the drill chuck opened, and the drilling mechanism withdrawn. The cutting device itself is completely portable, due to its compactness, and can easily be stored or transported until use is once again required.

This device is useful for cutting or slicing all types of cable and tubing, whether flexible or non-flexible, whether made of synthetics, plastics, or metal. It is especially useful for slicing or cutting the armour or casing used in various cables of electrical wires for the protection of the wires. In this case, the armour or casing can be sliced or cut without injuring the wire bundle within the cable.

It is to be understood that variations and modifications may be made which are not specifically described herein, but which will be obvious to those skilled in the art. It is intended to cover all such modifications and variations which fall within the spirit and scope of the invention as defined in the appended claims.

What is claimed is:

1. Apparatus for cutting flexible spiral tubes and the like comprising a housing, said housing having at least one groove positioned on an exterior surface thereof for accepting said tubes, chamber means in said housing, said groove having an opening into said chamber, an axle rotatably mounted in said chamber and extending from a surface of said housing, said axle being positionally fixed with respect to said groove, the axis of said axle being substantially perpendicular to the plane of said groove, a hacksaw blade within the chamber and fixedly mounted on said axle, said hacksaw blade having a portion thereof extending into said groove through the said opening, said hacksaw blade being otherwise contained entirely within said housing, said axle having means for accepting a drill motor to rotate said axle and said hacksaw blade, and an additional groove in said housing, said additional groove being of a different size than the first-mentioned groove.

2. The device according to claim 1 further comprising a collar movably mounted on the outer surface of said housing such that said collar can be moved with respect to said housing to selectively close one groove while leaving the other said groove open to accept a tube.

3. The device according to claim 2 wherein said collar has a groove situated to enable said collar groove to be aligned with either of said housing grooves as said collar is moved with respect to said housing.

4. The device according to claim 3 wherein said housing is circular.

5. Apparatus for cutting flexible spiral tubes and the like comprising a housing, said housing having at least one groove positioned on an exterior surface thereof for accepting said tubes, chamber means in said housing, said groove having an opening into said chamber, an axle rotatably mounted in said chamber and extending from a surface of said housing, said axle being positionally fixed with respect to said groove, the axis of said axle being substantially perpendicular to the plane of said groove, a hacksaw blade within the chamber and fixedly mounted on said axle, said hacksaw blade having a portion thereof extending into said groove through the said opening, said hacksaw blade being otherwise contained entirely within said housing, said axle having means for accepting the drill chuck of a drill motor to rotate said axle and said hacksaw blade, an annular extension of said housing extending from said surface and being spaced from said axle, and a plurality of individually adjustable securing means mounted in said annular extension in circumferentially spaced apart arrangement, said securing means being each adjustable toward and away from said axle for positioning and detachably holding the housing on the drill motor.

6. The apparatus according to claim 5 wherein said chamber extends through said housing and is closed at the housing surface opposite the surface at which the drill motor is connected to the axle to prevent accidental touching of the hacksaw blade by the operator.

7. The device according to claim 5 wherein said connecting means comprises threading on said axle to allow removable connection with a drilling mechanism.

8. The device according to claim 5 further comprising a ball bearing mounting between said axle and said housing to facilitate rotation of said axle.

9. The device according to claim 5 further comprising a cover, said cover being moveable between a first position in which said groove is exposed and a second position in which said groove is covered, and a spring clip on said cover, said spring clip contacting said housing when the cover is in said second position.

* * * * *